US008831790B2

(12) United States Patent
Kimura et al.

(10) Patent No.: US 8,831,790 B2
(45) Date of Patent: Sep. 9, 2014

(54) METHOD AND APPARATUS FOR CONTROL BATTERY AND SPECIFICATION DETERMINING METHOD OF BATTERY

(75) Inventors: Yasutaka Kimura, Hitachinaka (JP); Masahiro Watanabe, Hitachi (JP); Toshiyuki Sawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 13/171,685

(22) Filed: Jun. 29, 2011

(65) Prior Publication Data
US 2012/0004787 A1     Jan. 5, 2012

(30) Foreign Application Priority Data
Jun. 30, 2010    (JP) ................................. 2010-148472

(51) Int. Cl.
*G05D 3/12*     (2006.01)
*H02J 3/32*     (2006.01)
*H02J 13/00*     (2006.01)
*H02J 3/46*     (2006.01)

(52) U.S. Cl.
CPC ............... *H02J 3/32* (2013.01); *H02J 13/0006* (2013.01); *H02J 3/46* (2013.01); *Y02E 10/563* (2013.01); *Y02E 70/30* (2013.01); *Y02E 60/722* (2013.01); *Y04S 10/14* (2013.01); *Y02E 10/766* (2013.01); *Y02E 10/763* (2013.01); *Y02E 10/566* (2013.01); *Y04S 10/123* (2013.01)
USPC ........................................................ 700/297

(58) Field of Classification Search
USPC ........................................................ 700/297
See application file for complete search history.

(56) References Cited

U.S. PATENT DOCUMENTS 4,961,151 A * 10/1990 Early et al. .................... 700/297
5,225,712 A * 7/1993 Erdman .......................... 290/44
(Continued)

FOREIGN PATENT DOCUMENTS

| JP | 8-308104 | 11/1996 |
| JP | 9-135536 | 5/1997 |

(Continued)

OTHER PUBLICATIONS

JP Office Action for JP Patent Application No. 2010-148472, issued on Oct. 16, 2012 with partial translation.

(Continued)

*Primary Examiner* — Mohammad Ali
*Assistant Examiner* — Sivalingam Sivanesan
(74) *Attorney, Agent, or Firm* — Antonelli, Terry, Stout & Kraus, LLP.

(57) ABSTRACT

A battery control apparatus of this invention is provided which comprises: a battery installed on a feeder of a utility distribution system; batteries installed between pole-mounted transformers and branch points of the distribution lines; a communication network to transmit measurement data measured by meters; a battery control quantity calculation unit to determine battery control quantities from the measurement data acquired from the communication network; a load data collection unit to collect load data representing a combination of power consumption by a plurality of loads and generated power of distributed power generations; a frequency conversion unit to perform a frequency analysis on the load data; an intermediate-cycle component extraction unit to extract intermediate-cycle components; a battery control quantity calculation unit to determine battery control quantities from the extracted intermediate-cycle components; and a battery control command transmission unit to transmit the calculated control quantities to the batteries.

5 Claims, 6 Drawing Sheets

(56) References Cited

U.S. PATENT DOCUMENTS

| | | | |
|---|---|---|---|
| 7,759,901 B2 * | 7/2010 | Hirsch et al. | 320/129 |
| 7,966,101 B2 * | 6/2011 | Mitani et al. | 700/287 |
| 8,073,573 B2 * | 12/2011 | Chassin et al. | 700/286 |
| 8,401,712 B2 * | 3/2013 | Shimoda et al. | 700/297 |
| 8,452,462 B2 * | 5/2013 | Muneshima et al. | 700/293 |
| 2001/0012211 A1 * | 8/2001 | Hasegawa et al. | 363/131 |
| 2007/0035135 A1 * | 2/2007 | Yoshida | 290/44 |
| 2009/0164393 A1 * | 6/2009 | Takano et al. | 705/412 |
| 2011/0118886 A1 * | 5/2011 | Muneshima et al. | 700/293 |
| 2011/0288691 A1 * | 11/2011 | Abe et al. | 700/292 |

FOREIGN PATENT DOCUMENTS

| | | | | |
|---|---|---|---|---|
| JP | 2001-292531 | | 10/2001 | |
| JP | 2006-204081 | | 8/2006 | |
| JP | 2006-246584 | | 9/2006 | |
| JP | 2006-333563 | | 12/2006 | |
| JP | 2007-143225 | | 6/2007 | |
| JP | 2007-330017 | | 12/2007 | |
| JP | 2008-067544 | | 3/2008 | |
| JP | 2009-177941 | | 8/2009 | |
| JP | 2009177941 A | * | 8/2009 | H02J 3/48 |
| WO | WO 2009136641 A1 | * | 11/2009 | G05B 5/01 |

OTHER PUBLICATIONS

JP Office Action for Japanese Patent Application No. 2010-148472, issued on Jun. 25, 2013.

Chinese Office Action for Chinese Application No. 2011101786874, issued on Jun. 5, 2013.

* cited by examiner

METHOD AND APPARATUS FOR CONTROL BATTERY AND SPECIFICATION DETERMINING METHOD OF BATTERY

BACKGROUND OF THE INVENTION

The present invention relates to an apparatus and a method for controlling a battery and a battery specification determination method, and more specifically to a battery control apparatus and method and a battery specification determination method, both suitably used in a system connected with distributed power generations.

Distributed generations such as photovoltaic power generation and wind power generation are currently drawing attention but the amount of electricity produced by these power generations is influenced by natural environments. To secure stability in power distribution systems by minimizing power flow variations caused by the distributed generations, a technology has been known which adjusts a demand/supply balance in the distribution systems by installing batteries on the terminal load side of pole-mounted transformers in the distribution system.

One such technology has been known which controls the battery to reverse a stable power flow according to the amount of power generation. This technique is disclosed in, for example, JP-A-9-135536. Another technique is known which involves monitoring a generation state of the generator and a load state of the system and, based on these information, controlling a discharging state of the battery. This technique is disclosed in JP-A-8-308104.

SUMMARY OF THE INVENTION

Fluctuation components in the system include short-, medium- and long-cycle components. The technology disclosed in JP-A-9-135536 and JP-A-8-308104 deals with all of these components in controlling the battery. To compensate for the short-cycle fluctuations that change in relatively short cycles, a fast response is required of control, tending to make the battery and the control apparatus expensive. For the long-cycle fluctuations that change in relatively long cycles, the battery is required to have a correspondingly large capacity, which in turn tends to make the battery expensive.

Another drawback of the conventional technology described above is its inability to control the battery according to the battery installation location, making it impossible to perform an appropriate control at all times according to load variations.

A further drawback is that the above-mentioned conventional technology tends to make the battery capacity relatively large, with the result that appropriate battery specifications have not been able to be obtained.

It is therefore an object of this invention to solve at least one of the problems inherent in the conventional technology and provide, as one illustrative problem solving means, a battery control apparatus and method and a battery specification determination method that are able to minimize system fluctuations by building a relatively inexpensive system.

To achieve the above objective, this invention provides a battery control apparatus to control a battery connected to a power system, comprising: a load data collection unit 1-1 to collect load data in the system; a component extraction unit 1-3 to extract from the load data components larger than a predetermined frequency; and a control unit 1-5 to control the battery based on the extracted components.

Alternatively, the invention provides a battery control apparatus to control a battery connected to a power distribution system that is connected with a plurality of loads and a plurality of distributed power generations, wherein the battery is installed in a section between a pole-mounted transformer and a branch point of a low-voltage distribution line, the battery control apparatus comprising: a communication network 8 to acquire measurement data through communication channels from a meter installed in the section between the pole-mounted transformer and the branch point of the low-voltage distribution line; and a battery control quantity determination device 1 to determine a control quantity for the battery based on the measurement data acquired from the communication network.

Alternatively, the invention provides a battery control apparatus to control a battery connected to a power distribution system that is connected with a plurality of loads and a plurality of distributed power generations, wherein the battery is installed in a section between a feeder and a branch point of a high-voltage distribution line, the battery control apparatus comprising: a communication network 8 to acquire measurement data through communication channels from a meter installed in the section between the feeder and the branch point of a high-voltage distribution line; and a battery control quantity determination device 1 to determine a control quantity for the battery based on the measurement data acquired from the communication network.

Alternatively, the invention provides a battery control apparatus to control a battery connected to a power distribution system that is connected with a plurality of loads and a plurality of distributed power generations, wherein the battery is installed on a terminal side of a branch point of a low-voltage distribution line, the battery control apparatus comprising: a communication network 8 to acquire measurement data through communication channels from a meter installed on the terminal side of the branch point of the low-voltage distribution line; and a battery control quantity determination device 1 to determine a control quantity for the battery based on the measurement data acquired from the communication network.

Alternatively, the invention provides a battery specification determination method comprising the steps of: collecting loads in a system as load data; extracting components larger than a predetermined frequency from the load data; and based on the extracted components, determining specifications of the battery connected to the system.

One construction of this invention takes advantage of the fact that, since short-cycle components fluctuate quickly, they are often canceled by other interconnected distribution systems and that long-cycle components can be controlled by the generator side forecasting a large load fluctuation pattern in advance. So the extraction of only the intermediate-cycle components allows for an efficient control of the batteries. Another construction of this invention allows for the battery control according to the location of the battery. Yet another construction of this invention can reduce the capacity of the battery and produce appropriate specifications of the battery.

Other objects, features and advantages of the invention will become apparent from the following description of the embodiments of the invention taken in conjunction with the accompanying drawings.

DETAILED DESCRIPTION OF THE EMBODIMENT

Figure 1:
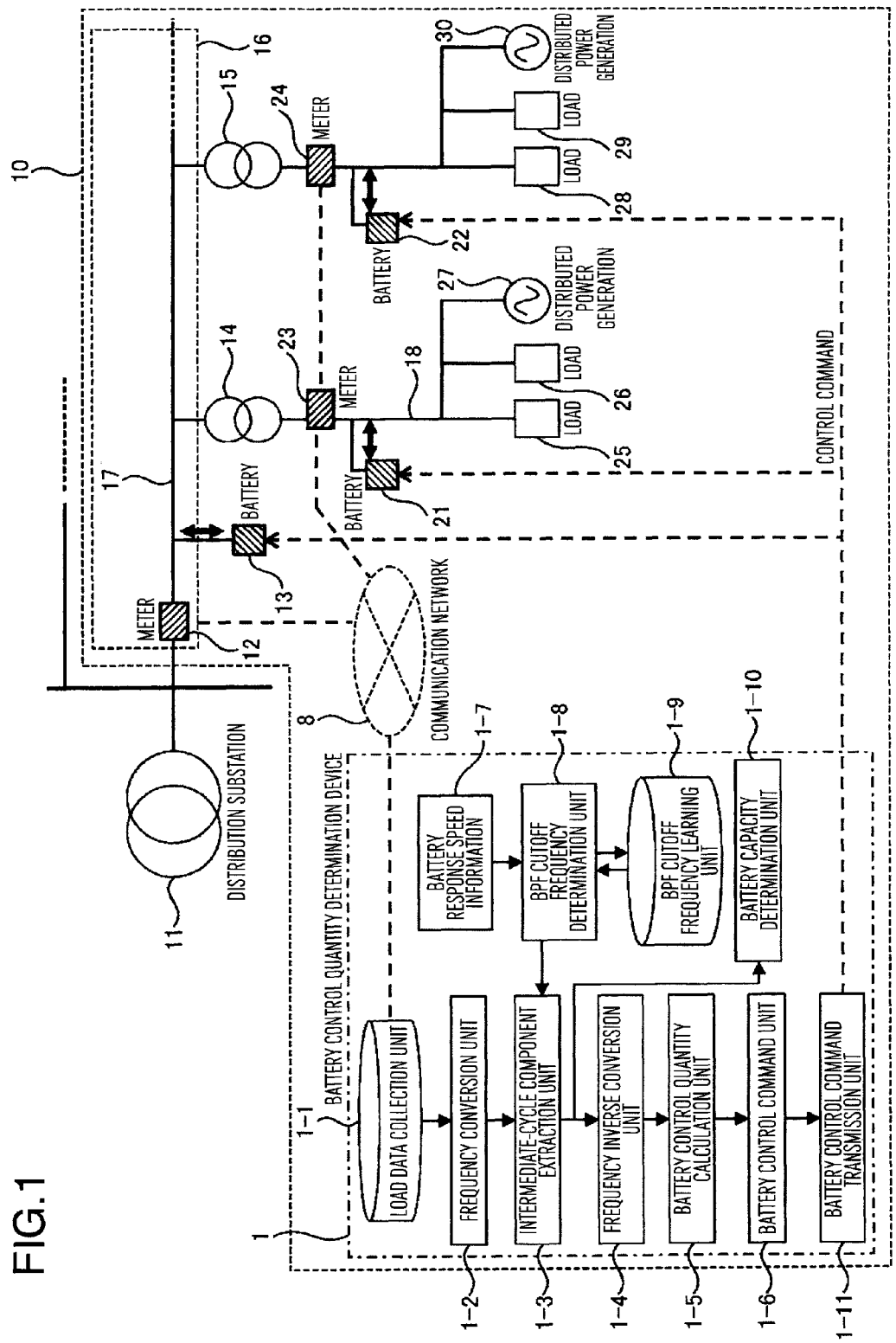
FIG. 1 is a configuration diagram showing an optimal battery control system as one embodiment of this invention.

FIG. 1 shows a configuration of an optimal battery control system 10 for a distribution system as one embodiment of this invention. In FIG. 1, the optimal battery control system 10 comprises a battery 13 installed on a feeder 16 of a utility power distribution system, batteries 21, 22 installed between pole-mounted transformers 14, 15 and branch points of low-voltage power distribution lines 18, a communication network 8 to transmit data measured by meters 12, 23, 24, and a battery control quantity determination device 1 that determines a battery control quantity from the data acquired from the communication network.

The battery control quantity determination device 1 comprises: a load data collection unit 1-1 to gather an overall power data obtained by combining an energy demand of a plurality of loads 25, 26, 28, 29 and an output power of distributed generations 27, 30; a frequency conversion unit 1-2 to perform a frequency analysis based on the acquired load data; a BPF cutoff frequency determination unit 1-8 to tune a bandpass filter (BPF) in a frequency converted from battery response speed information 1-7; an intermediate-cycle component extraction unit 1-3 to extract intermediate-cycle components by using cutoff frequencies; a BPF cutoff frequency learning unit 1-9 to learn the BPF cutoff frequency; a frequency inverse conversion unit 1-4 to inversely convert the extracted intermediate-cycle components; a battery control quantity calculation unit 1-5 to determine a battery control quantity; a battery control command unit 1-6 to issue a control command based on the determined control quantity; a battery control command transmission unit 1-11 to transmit a control signal to the batteries 13, 21, 22; and a battery capacity determination unit 1-10 to determine the capacity of the batteries according to the output from the intermediate-cycle component extraction unit 1-3.

First, a method will be explained for determining the specification (capacity) and the control quantity of the battery 21 from the meter 23 installed between the pole-mounted transformer 14 and a branch point of the low-voltage distribution line.

To take into account differences in control amount between a summer season and an intermediate season, explanations will be given about data of both seasons.

Figure 2:
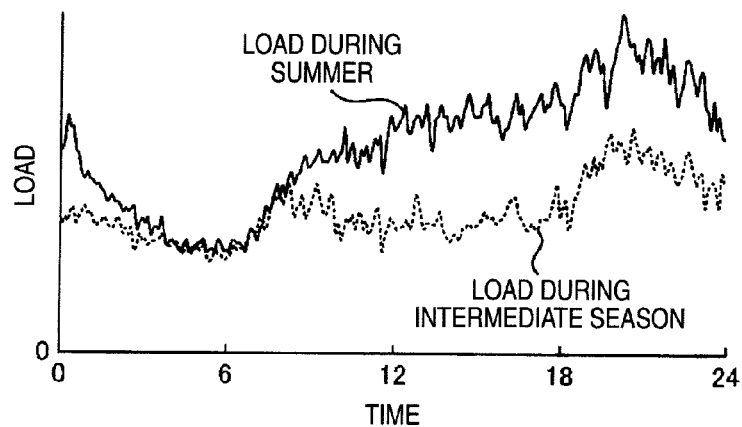
FIG. 2 shows an example pattern of power demand measured in a pole-mounted transformer during summer and intermediate seasons.
Figure 3:
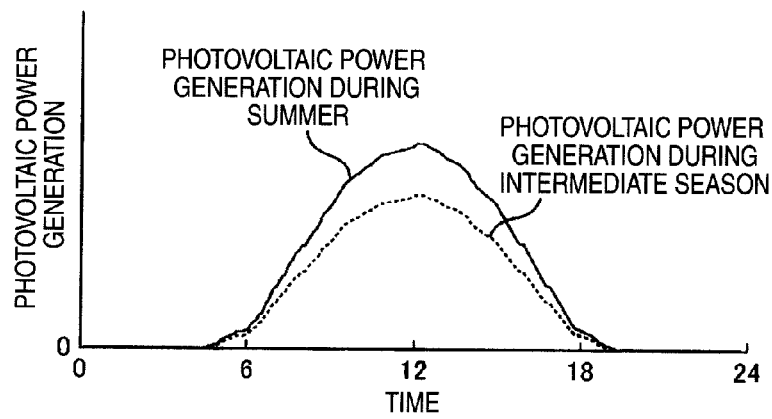
FIG. 3 shows a pattern of a photovoltaic power generation as one form of a distributed generation connected to a distributed power system during summer and intermediate seasons.
Figure 4:
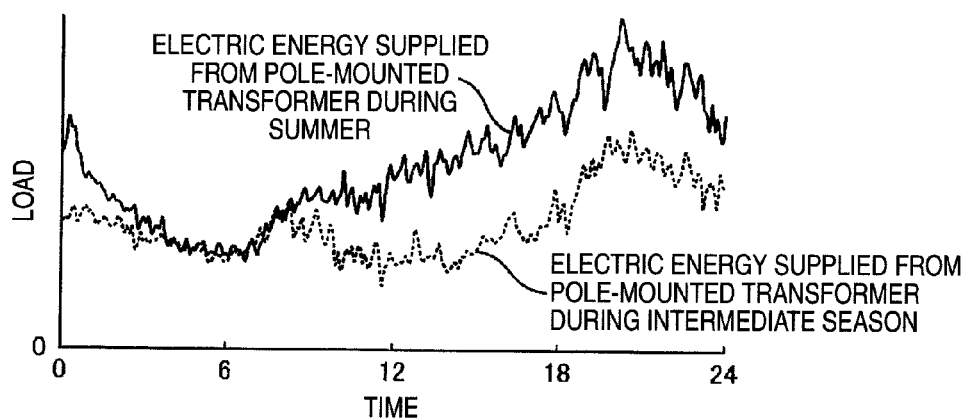
FIG. 4 shows an example pattern of power demand measured in a pole-mounted transformer during summer and intermediate seasons, which represents a sum of power demands from a plurality of loads and an amount of a photovoltaic power generation as one form of distributed generation.

FIG. 2 shows one-day load curves of all loads connected to a pole-mounted transformer during summer and intermediate seasons. FIG. 3 shows amounts of power produced in one day by a photovoltaic power generation, a form of a distributed generation 27, during the summer and intermediate seasons. FIG. 4 shows load curves during the summer and intermediate seasons measured by the meter 23 in the pole-mounted transformer 14, each load curve representing a combination of the amount of power consumed by the loads 25, 26 and the amount of power generated by the distributed generation (photovoltaic power generation) 27.

In the case of the photovoltaic power generation, it is seen from FIG. 4 that the power demand decreases because of power generation during the day. The amount of power consumed, measured by the meter 23 between the pole-mounted transformer 14 and a branch point of the low-voltage power distribution line 18 in FIG. 1 is transmitted every few minutes to the communication network 8, from which it is collected by the load data collection unit 1-1. Based on the collected data on the load, a frequency analysis is preformed by the frequency conversion unit 1-2. The frequency conversion is executed using a Fourier transform expressed by Equation (1) below. As the Fourier transform, a fast Fourier transform may be used.

$$\hat{f}(\xi) = \int_{-\infty}^{\infty} f(x) e^{-2\pi i x \xi} dx, \text{ where } x: \text{time [s]}, \xi: \text{frequency [Hz]} \quad (1)$$

Components ranging from a cutoff frequency 1 to a cutoff frequency 2 are extracted from the frequency conversion result by the intermediate-cycle component extraction unit 1-3. That is, those components with frequencies lower than the cutoff frequency 1 are cut off or attenuated to a degree virtually equivalent to a cutoff. Components with frequencies higher than the cutoff frequency 2 are similarly cut off or attenuated to a degree virtually equivalent to a cutoff. Here, the intermediate-cycle components (those between the cutoff frequency 1 and the cutoff frequency 2) are extracted by a bandpass filter (BPF). The cutoff frequency 1 and the cutoff frequency 2 can be determined by the BPF cutoff frequency determination unit 1-8.

The BPF cutoff frequency determination unit 1-8 determines the cutoff frequency 1 and the cutoff frequency 2 by referring to the battery response speed information 1-7. Here, if the battery response speed is fast, the cutoff frequency 1 and the cutoff frequency 2 are shifted toward a shorter frequency side; and if it is slow, the cutoff frequencies 1, 2 are shifted toward a longer frequency side. At the same time, the result of learning by the BPF cutoff frequency learning unit 1-9 is reflected on the cutoff frequencies. Here, as a typical example, the cutoff frequency 1 is set at 0.0005 Hz and the cutoff frequency 2 at 0.03 Hz. It is desired that the cutoff frequency 1 be learned in a range of 000005 Hz to 0.005 Hz and the cutoff frequency 2 in a range of 0.003 Hz to 0.1 Hz.

The frequency components to be extracted are determined by the BPF cutoff frequency determination unit 1-8 according to load fluctuation patterns, i.e., the load variation characteristics of each region. Further, since load fluctuation components may change due to external factors, such as changes made in the configuration of the distribution system or seasonal variations, the BPF cutoff frequency determination unit 1-8 may be provided with a function to have the BPF cutoff frequency learning unit 1-9 execute learning in a way that allows for making changes in the cutoff frequencies as the load fluctuation components vary. Extracting only the intermediate-cycle components obviates the need to compensate for the components with small frequencies (long-cycle components), such as shown in FIG. 5, making it possible to reduce the capacity of the battery.

Figure 5:
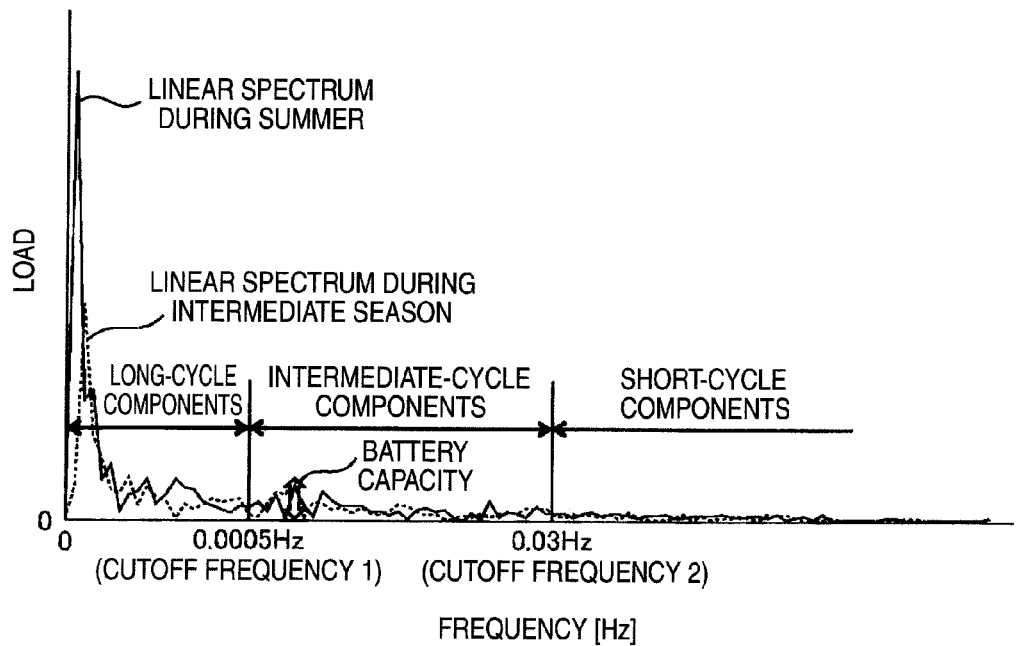
FIG. 5 shows a relationship between a frequency and a power demand that are broken down into short-, medium- and long-cycle components by a frequency analysis performed on the total power demand measured in a pole-mounted transformer during summer and intermediate seasons.

The BPF cutoff frequency learning unit 1-9 checks if, in the linear spectrum of FIG. 5, there is any component larger than a predetermined level in a range that is a predetermined frequency lower than the cutoff frequency 1 (near the cutoff frequency 1). If so, the BPF cutoff frequency learning unit 1-9 makes the cutoff frequency 1 lower so that the component of interest is included.

The BPF cutoff frequency learning unit 1-9 also checks if, in the linear spectrum of FIG. 5, there is any component larger than a predetermined level in a range that is a predetermined frequency higher than the cutoff frequency 2 (near the cutoff frequency 2). If so, it makes the cutoff frequency 2 higher so that the component of interest is included.

Data of components between the cutoff frequency 1 and the cutoff frequency 2 is gathered every few tens of seconds over a whole year by the intermediate-cycle component extraction unit 1-3. This data is saved year after year.

The BPF cutoff frequency determination unit 1-8 stores an average value of each component over the last 12 months and determines a frequency of the largest (peak) component among them. Similarly, it also stores an average value of each component over the past three months and determines a frequency of the largest (peak) component among them. From a difference between the frequency of the 12-month average peak and the frequency of the 3-month average peak, correction amounts for the cutoff frequency 1 and the cutoff frequency 2 are calculated. This calculation of the correction amounts is executed, for example, four times a year (March, June, September and December). The adoption of the changes in the cutoff frequency 1 and the cutoff frequency 2 in the actual control will be made nine months later. In other words, the calculated correction amounts will not be used for nine months. Instead of updating the cutoff frequencies 1 and 2 nine months later, the cutoff frequencies may be changed whenever an event occurs, as when the distribution system is changed or the maximum value changed, or at the change of the seasons.

The spectrum between the cutoff frequency 1 and the cutoff frequency 2 is accumulated, for example, every few tens of minutes over one year by the intermediate-cycle component extraction unit 1-3, and the battery capacity determination unit 1-10 sets the battery capacity equal to the largest component (or a predetermined amount larger than that component) in the spectrum of FIG. 5.

That is, the battery capacity determination unit 1-10 determines as the battery capacity the largest among the load fluctuations of the extracted intermediate-cycle components. That is, the capacity shown in FIG. 5 needs only to be provided.

Next, a procedure for the battery control command transmission unit 1-11 to send the control quantity determined by the battery control command unit 1-6 to the battery 21 for its control will be described as follows.

The frequency inverse conversion unit 1-4 performs an inverse Fourier transform on the components ranging from the cutoff frequency 1 to the cutoff frequency 2 extracted by the intermediate-cycle component extraction unit 1-3 by Equation (2) below. The inverse Fourier transform may use an inverse fast Fourier transform.

$$f(x) = \int_{-\infty}^{\infty} \hat{f}(\xi) e^{2\pi i x \xi} d\xi, \text{ where } x\text{: time [s], } \xi\text{: frequency [Hz]} \quad (2)$$

Based on the result of the inverse Fourier transform, the battery control quantity calculation unit 1-5 calculates the control quantity.

Figure 6:
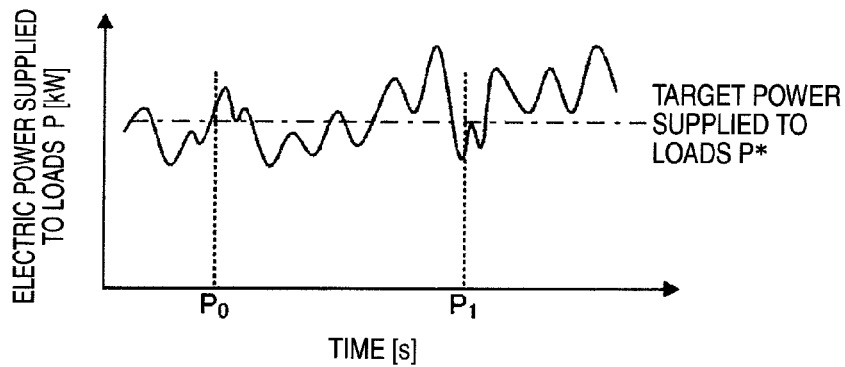
FIG. 6 shows a result of inverse Fourier transform of power demand as related to time.

The result of inverse Fourier transform is shown in FIG. 6. It is seen that the electric power supplied to loads P (kW), the result of the inverse Fourier transform, changes with time (s). For example, the result of the inverse Fourier transform at time $t_0$ (s) in FIG. 6 is $P_0$ kW, which is compared with a target power P* (e.g., 5 kW). If it is greater than the target power P* (e.g., 5 kW), the battery control quantity calculation unit 1-5 calculates the battery control quantity such that the batteries 21, 22 can absorb the difference (P*−$P_0$) (by charging) to bring the component in question, the result of the inverse Fourier transform, down to the target power P* (e.g., 5 kW).

If, at time $t_1$ (s) the result of the inverse Fourier transform is $P_1$ kW and smaller than the target power P* (e.g., 5 kW), the battery control quantity is determined such that the batteries 21, 22 can supply the difference (P*−$P_1$) (by discharging) to bring the component in question, the result of the inverse Fourier transform, up to the target power P* (e.g., 5 kW).

Although in the above explanation the control has been described to be performed to cause the result of the inverse Fourier transform to become the predetermined value (5 kW), if a duration in which the inverse Fourier transform result is larger than, for example, 5 kW continues, the target power P* may be changed to 5+ΔP kW. Further, if a duration in which the inverse Fourier transform result is smaller than the predetermined value (5 kW), the target power P* may be changed to 5−ΔP kW. Although the predetermined value is set at 5 kW in this example, it may be any desired value that can change properly according to the season and the time in one day.

The battery control quantity may, of course, be corrected according to the condition of the batteries 21, 22. That is, the battery control is done to limit discharging if the amount of energy stored in the batteries is small and to limit charging if the stored energy is close to their upper limit. Further, when the battery control command unit 1-6 instructs the transmission of this control quantity, the battery control command transmission unit 1-11 issues a command to the batteries 21, 22.

With this configuration, the installed batteries 21, 22 allow the control quantity to be determined for individual pole-mounted transformers, assuring an optimum control. This allows for reductions in the battery capacity and in the line capacity of the distribution lines, alleviating burdens on the distribution system and reducing facility management cost.

Next, as another embodiment, a method of determining the control quantity of the battery 13 based on a reading of a meter 12 installed at a branch point between the feeders 16 and the high-voltage distribution line. Portions similar to the corresponding ones in the preceding embodiment will be omitted from the following explanation that covers only the portions different from the first embodiment.

Figure 7:
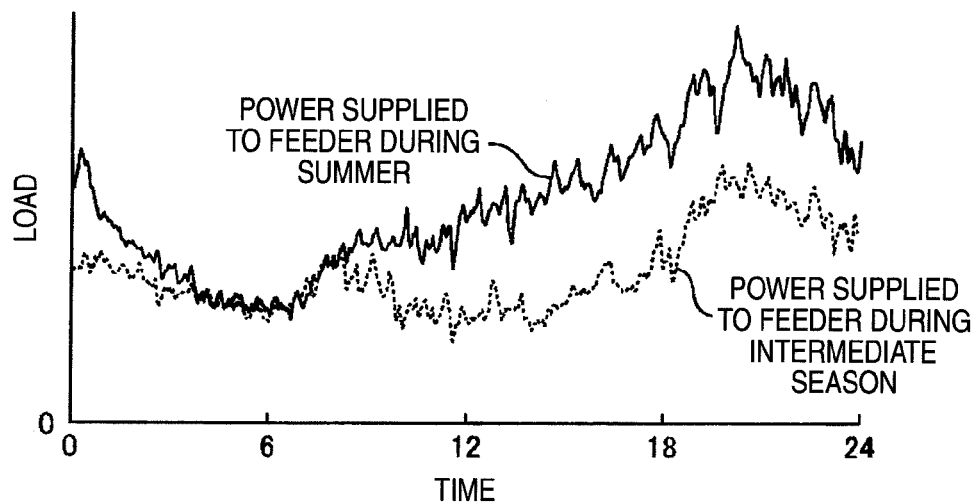
FIG. 7 shows an example pattern of power demand measured in a feeder during summer and intermediate seasons.
Figure 8:
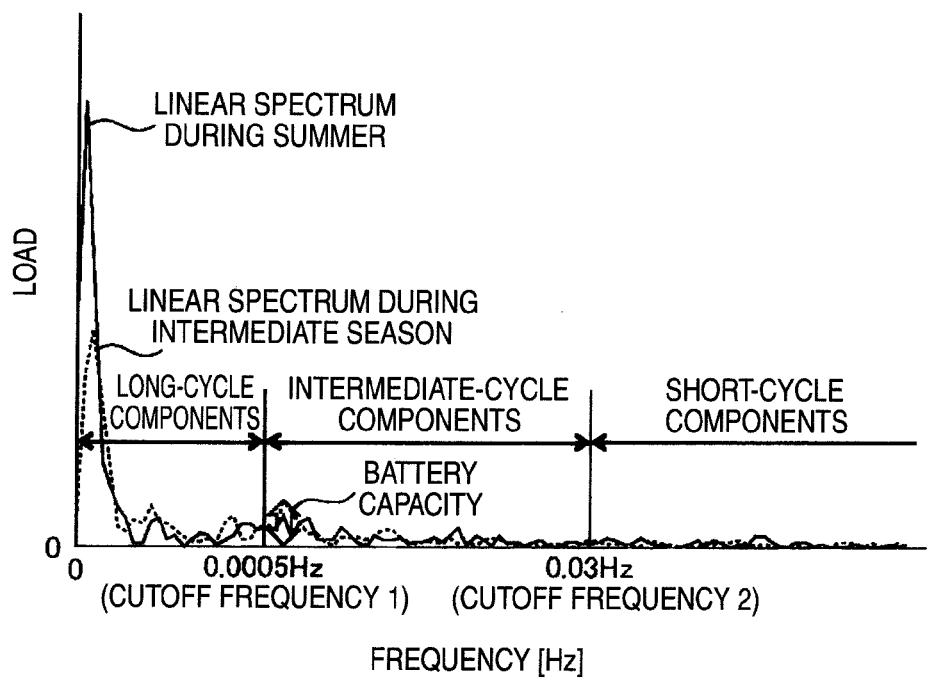
FIG. 8 shows an example relationship between a frequency and a power demand that are broken down into short-, medium- and long-cycle components by a frequency analysis performed on the power demand measured in the feeder during summer and intermediate seasons.

FIG. 7 shows load curves in summer and intermediate seasons measured at the meter 12 on the feeders 16. The amount of electric energy supplied to a section ranging from the feeders 16 to a branch point of the high-voltage distribution line 17 in FIG. 1 is transmitted to the communication network 8 every few seconds, from which it is collected by the load data collection unit 1-1. The frequency conversion unit 1-2 performs a frequency analysis on the collected load data as shown in FIG. 8 to determine intermediate-cycle components to be extracted. The intermediate-cycle components to be extracted are those ranging from the cutoff frequency 1 to the cutoff frequency 2. Since the frequency components to be extracted can be determined by the cutoff frequencies of the BPF cutoff frequency determination unit 1-8, the intermediate-cycle component extraction unit 1-3 has the BPF cutoff frequency determination unit 1-8 determine the frequency components to be extracted according to the load fluctuation pattern, i.e., regional load variation characteristics. Further, since load fluctuation components may change due to external factors, such as changes made in the configuration of the distribution system or seasonal variations, the BPF cutoff frequency determination unit 1-8 may be provided with a function to have the BPF cutoff frequency learning unit 1-9 execute learning in a way that allows for making changes in the cutoff frequencies as the load fluctuation components vary. The intermediate-cycle components to be extracted are those that fluctuate every few tens of seconds to every few tens of minutes. Extracting only the intermediate-cycle components obviates the need to compensate for the components with small frequencies (long-cycle components), such as shown in FIG. 8, making it possible to reduce the capacity of the battery. Next, the battery control quantity calculation unit 1-5 and the battery capacity determination unit 1-10 determine the largest of load fluctuations of the extracted intermediate-cycle components as the control quantity. That is, the control quantity shown in FIG. 8 needs only to be guaranteed. Further, the command value determined by the battery control command unit 1-6 is sent from the battery control command transmission unit 1-11 to the battery 13 for its control. With this configuration, it is possible to determine the control quantity for the installed battery 13 on each feeder 16, allowing for an optimum control. This offers the following advantages. In a case where the battery cannot be installed in the pole-mounted transformer 14 because of problems in terms of right of way and cost, the installing of the battery only in a section between the feeder and a branch point of the high-voltage distribution line or in a section between the pole-mounted transformer and a branch point of the low-voltage distribution line can reduce the capacity of the battery and also the line capacity of the distribution line. This in turn alleviates the burden on the distribution lines, leading to a reduced facility management cost. The advantage of installing the battery on the feeder 16 is the ability to compensate for the fluctuations that cannot be absorbed by the low-voltage power distribution line 18.

Next, a method will be explained which determines the control quantity for the battery 32, based on a reading of a meter 31 that is installed in a section on the terminal side of the branch point of the low-voltage power distribution line 18 downstream of the pole-mounted transformer 14.

Figure 9:
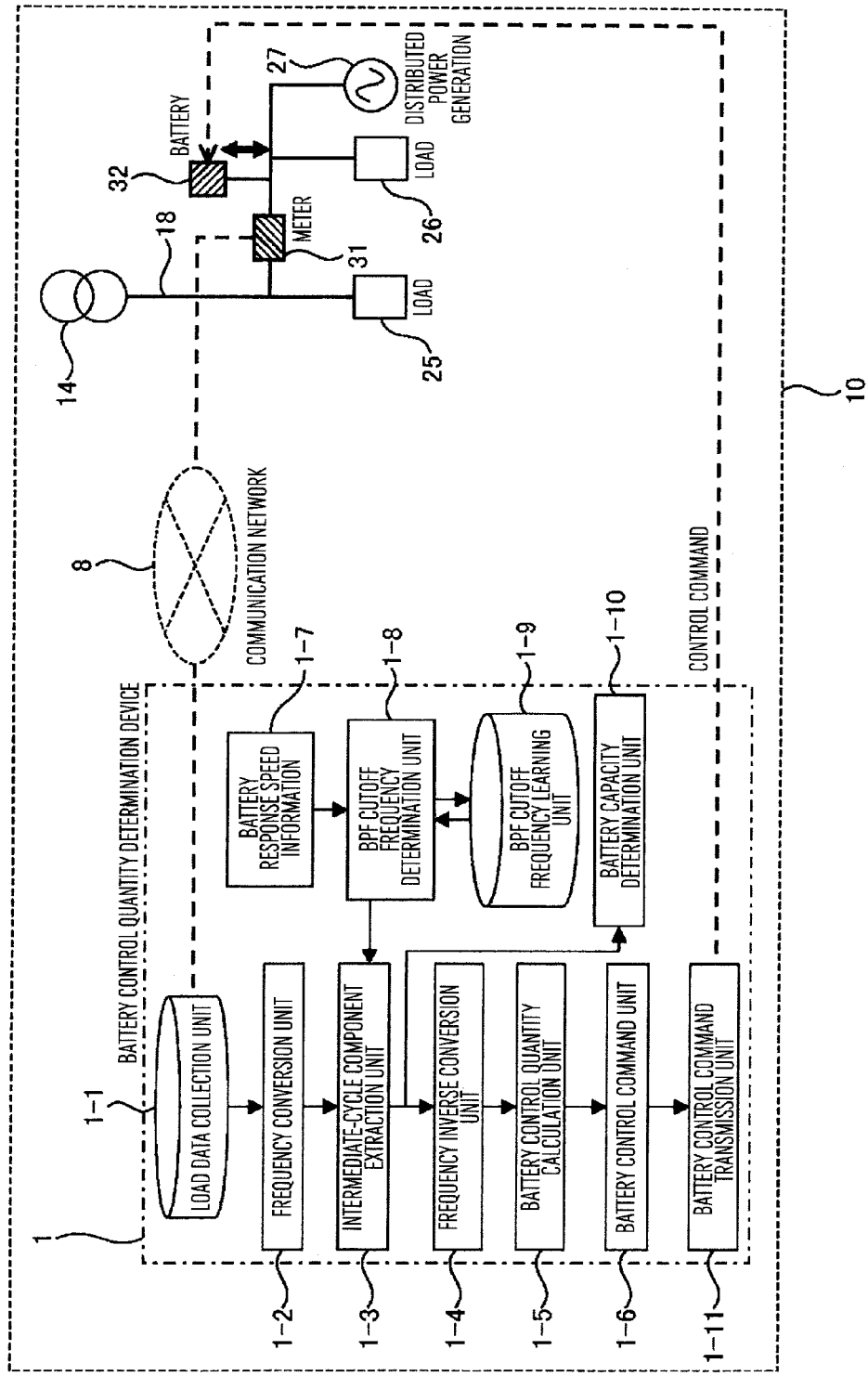
FIG. 9 is a configuration of another optimal battery control system as one embodiment of this invention.

FIG. 9 is a configuration diagram of the optimal battery control system 10 for a power distribution system as one embodiment of this invention. In FIG. 9 the optimal battery control system 10 comprises a battery 32 installed on the terminal side of the low-voltage distribution line downstream of the pole-mounted transformer in the distribution system; a communication network 8 for transmitting data measured by the meter 31; and a battery control quantity determination device 1 for determining the battery control quantity based on the data acquired from the communication network.

Figure 10:
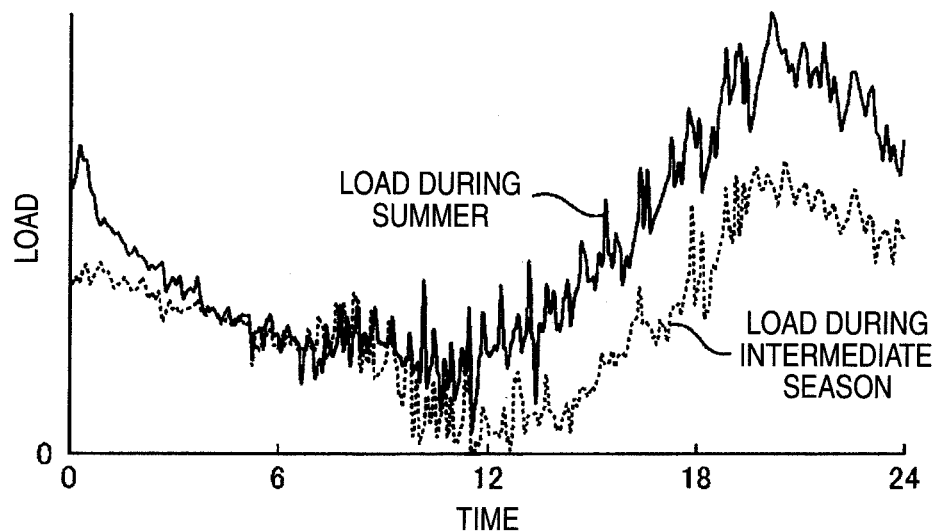
FIG. 10 shows an example pattern of power demand during summer and intermediate seasons when a battery is installed on the terminal side of a branch point of a low-voltage distribution line.
Figure 11:
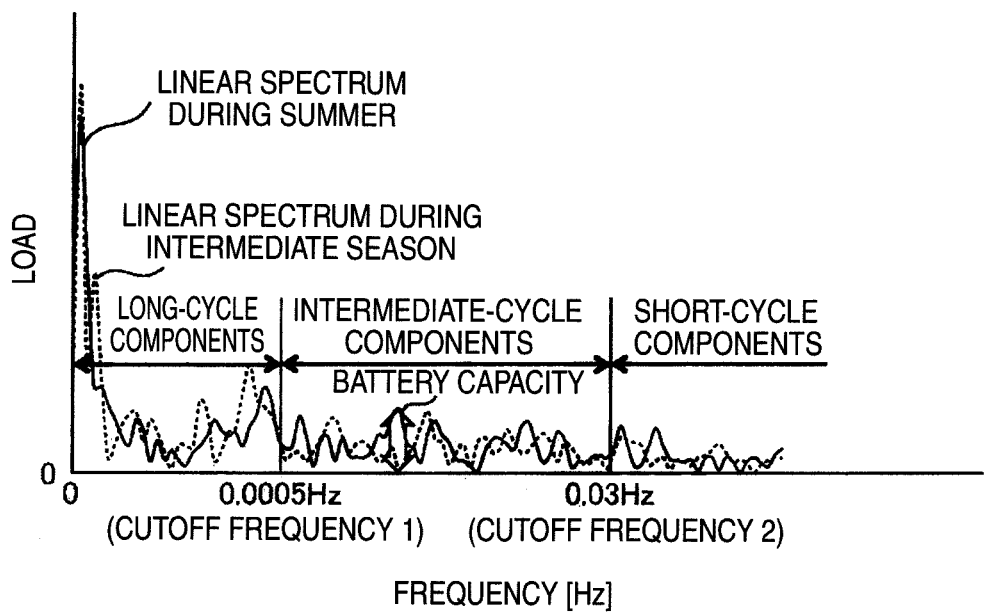
FIG. 11 shows a relationship between a frequency and a power demand that are broken down into short-, medium- and long-cycle components by a frequency analysis performed on the power demand measured by a meter during summer and intermediate seasons when the battery is installed on the terminal side of the branch point of the low-voltage distribution line.

FIG. 10 shows load curves measured by the meter 31 during summer and intermediate seasons. The amount of load measured by the meter 31 of FIG. 9 is sent to the communication network 8 every few seconds, from which it is collected by the load data collection unit 1-1. Based on the collected data of load, the frequency conversion unit 1-2 performs a frequency conversion, such as shown in FIG. 10, to determine intermediate-cycle components to be extracted. The intermediate-cycle components are extracted by the intermediate-cycle component extraction unit 1-3. Since the frequency components to be extracted can be determined by the cutoff frequencies, the BPF cutoff frequency determination unit 1-8 is made to determine the frequency components to be extracted according to the load fluctuation pattern, i.e., regional load variation characteristics. Further, since load fluctuation components may change due to external factors, such as changes made in the configuration of the distribution system or seasonal variations, the BPF cutoff frequency determination unit 1-8 may be provided with a function to have the BPF cutoff frequency learning unit 1-9 execute learning in a way that allows for making changes in the cutoff frequencies as the load fluctuation components vary. The intermediate-cycle components to be extracted are those that fluctuate every few tens of seconds to every few tens of minutes. Extracting only the intermediate-cycle components obviates the need to compensate for the components with small frequencies (long-cycle components), such as shown in FIG. 11, making it possible to reduce the capacity of the battery by the battery capacity determination unit 1-10. Next, the battery control quantity calculation unit 1-5 determines the largest of load fluctuations of the extracted intermediate-cycle components as the control quantity. That is, the control quantity shown in FIG. 11 needs only to be guaranteed. Further, the control quantity determined by the battery control quantity calculation unit 1-5 is fed to the battery control command unit 1-6 and then transmitted by the battery control command transmission unit 1-11 to the battery 13 for its control.

This configuration allows the control quantity for the installed battery 32 to be determined as in the configuration of FIG. 1, allowing for optimal control. Although there is a concern that the battery capacity may become larger when the battery 32 is installed on the load side of the branch point of the low-voltage distribution line than when the battery 21 is installed in a section between the pole-mounted transformer 14 and the branch point of the low-voltage power distribution line 18 or when the battery 13 is installed in a section between the feeder 16 and the branch point of the high-voltage distribution line 17, the battery capacity can be made smaller than when all load fluctuation components are compensated.

In the embodiments of this invention, with the battery installed in a section between the pole-mounted transformer and the branch point of the low-voltage distribution line, or in a section between the feeder and the branch point of the high-voltage distribution line, or on the terminal side of the branch point of the low-voltage distribution line, the control of only the intermediate-cycle fluctuation components of a combination of loads and distributed generations, such as photovoltaic power, wind power and fuel cells, by the batteries can not only reduce the battery capacity but eliminate the need to enhance the control response. Here, it is assumed that the short-cycle components and the long-cycle components are absorbed by the distribution system side. Since the short-cycle components fluctuate rapidly and their control responses are fast, they may be canceled by other interconnected distribution systems. The fast fluctuations can also be absorbed by governors of generators such as thermal generators. The reason for excluding the long-cycle components from the battery control is that since they may extend as long as a few tens of minutes, they can be controlled by the generators forecasting a large load fluctuation pattern in advance and that the compensation for even the long-cycle components can result in an increased battery capacity. The advantageous effect similar to what has been described above can be produced when the batteries are located either in a section between the pole-mounted transformer and the branch point of the low-voltage distribution line, in a section between the feeder and the branch point of the high-voltage distribution line or on the terminal side of the branch point of the low-voltage distribution line, or at combined locations of two or more of them.

By controlling the power flow in the distribution system for each low-voltage distribution line, for each transformer and for each feeder, not only can the loads and the distributed generations be managed in a simplified manner by a small control quantity but an increased number of distributed generations can also be introduced. Further, by putting the batteries in a low-voltage distribution line where a plurality of loads and distributed power generations are located, or in sections from a transformer or feeder to a branch point, the power flow fluctuations in a plurality of loads and distributed generations, such as photovoltaic power, wind power and fuel cells, can be shared with the power distribution system so that only the intermediate-cycle components can be absorbed by the batteries. This in turn can reduce the battery capacities. Further, since the fluctuation components can be absorbed by the batteries, the burden on power system equipment, such as transformer capacities and distribution line capacities, can be reduced, resulting in a reduced overall facility cost.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A battery control apparatus to control a battery connected to a power system, comprising:
   a load data collection unit which collects load data in the system;
   a frequency determining unit which determines a first frequency and a second frequency larger than the first frequency, among frequencies converted from the load data;
   an intermediate-cycle component extraction unit which extracts load variation components of intermediate-cycle in a range from the first frequency to the second frequency, based on the frequencies determined by the frequency determining unit;
   a control unit which controls the battery based on the extracted load variation components; and
   a parameter learning unit which collects and learns parameter information including load variation components in the system, wherein
   the frequency determining unit changes at least one of the first and second frequencies based on battery response speed information representing information of a response speed as to control of the battery and the parameter information of the parameter learning unit, and
   the intermediate-cycle component extraction unit extracts the load variation components in accordance with at least one of the first and second frequencies thus changed.

2. The battery control apparatus according to claim 1, wherein
   the parameter learning unit determines whether or not there is any load variation component larger than a predetermined level in each frequency other than the intermediate-cycle, and the parameter learning unit changes, when it is determined that there is any load variation component larger than the predetermined level in one frequency other than the intermediate-cycle, at least one of the first and second frequencies so as to contain the one frequency.

3. The battery control apparatus according to claim 2, wherein
   the frequency determining unit determines a frequency having a largest average value of the load variation components based on past data of the intermediate-cycle, and changes at least one of the first and second frequencies based on the frequency thus determined.

4. The battery control apparatus according to claim 1, wherein
   the frequency determining unit determines a frequency having a largest average value of the load variation components based on past data of the intermediate-cycle, and changes at least one of the first and second frequencies based on the frequency thus determined.

5. The battery control apparatus according to claim 1, further comprising:
   circuitry and a processor configured to effect the: the load data collection unit, the frequency determining unit, the intermediate-cycle component extraction unit, the control unit and the parameter learning unit.

* * * * *